United States Patent
Kim et al.

(10) Patent No.: US 10,564,766 B2
(45) Date of Patent: Feb. 18, 2020

(54) TOUCH SENSOR, DISPLAY DEVICE INCLUDING THE SAME, AND METHOD FOR DRIVING THE TOUCH SENSOR

(71) Applicant: Samsung Display Co., Ltd., Yongin-si (KR)

(72) Inventors: Ki Cheol Kim, Yongin-si (KR); Yeon Tae Kim, Yongin-si (KR); Young Soo No, Yongin-si (KR); Hwan Hee Jeong, Yongin-si (KR); In Young Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 44 days.

(21) Appl. No.: 15/702,381

(22) Filed: Sep. 12, 2017

(65) Prior Publication Data
US 2018/0150176 A1    May 31, 2018

(30) Foreign Application Priority Data

Nov. 30, 2016    (KR) .......................... 10-2016-0161681

(51) Int. Cl.
*G06F 3/041*    (2006.01)
*G06F 3/044*    (2006.01)
*G09G 3/3208*    (2016.01)

(52) U.S. Cl.
CPC ............ *G06F 3/0416* (2013.01); *G06F 3/044* (2013.01); *G06F 3/0412* (2013.01); *G06F 3/0414* (2013.01); *G09G 3/3208* (2013.01)

(58) Field of Classification Search
CPC combination set(s) only.
See application file for complete search history.

(56) References Cited

U.S. PATENT DOCUMENTS

| | | | |
|---|---|---|---|
| 9,329,719 B2 | 5/2016 | Mõlne et al. | |
| 10,175,804 B2 * | 1/2019 | Yoon | ..................... G06F 3/0414 |
| 2006/0197753 A1 | 9/2006 | Hotelling | |
| 2010/0214247 A1 * | 8/2010 | Tang | ..................... H03K 17/98 345/173 |

(Continued)

FOREIGN PATENT DOCUMENTS

| KR | 10-1257964 | 4/2013 |
|---|---|---|
| KR | 10-2016-0040504 | 4/2016 |

*Primary Examiner* — Afroza Chowdhury
(74) *Attorney, Agent, or Firm* — H.C. Park & Associates, PLC

(57) ABSTRACT

A touch sensor, a display device including the same, and a method for driving a touch sensor that includes a substrate, first connection lines to transmit first output signals, first electrodes disposed on the substrate connected to the first connection lines to transmit the first output signals to the first connection lines, second connection lines to transmit second output signals, second electrodes disposed on the substrate connected to the second connection lines to transmit the second output signals to the second connection lines, an auxiliary electrode spaced apart from the substrate, the auxiliary electrode forming a capacitance with the first electrodes and the second electrodes, and a touch controller connected to the first and second connection lines to receive the first and second output signals from the first and second connection lines, and to calculate a position and a pressure of a touch, using the first and second output signals.

15 Claims, 9 Drawing Sheets

(56) References Cited

U.S. PATENT DOCUMENTS

| | | | |
|---|---|---|---|
| 2013/0093711 A1* | 4/2013 | Liu | G06F 3/044 345/174 |
| 2015/0062062 A1* | 3/2015 | Han | G06F 3/0412 345/174 |
| 2015/0062452 A1* | 3/2015 | Shih | G06F 3/044 349/12 |
| 2015/0153895 A1 | 6/2015 | Hotelling | |
| 2015/0261348 A1* | 9/2015 | Jang | G06F 3/044 345/174 |
| 2015/0268802 A1* | 9/2015 | Kim | G06F 3/0482 715/763 |
| 2015/0287381 A1* | 10/2015 | Kim | G06F 3/044 345/174 |
| 2016/0062504 A1* | 3/2016 | Hwang | G06F 3/0412 345/174 |
| 2017/0060340 A1* | 3/2017 | Chen | G06F 3/0412 |
| 2017/0131829 A1* | 5/2017 | Takahashi | G06F 3/0412 |
| 2018/0107325 A1* | 4/2018 | Hong | G06F 3/044 |

\* cited by examiner

TOUCH SENSOR, DISPLAY DEVICE INCLUDING THE SAME, AND METHOD FOR DRIVING THE TOUCH SENSOR

CROSS-REFERENCE TO RELATED APPLICATION

This application claims priority from and the benefit of Korean Patent Application No. 10-2016-0161681, filed on Nov. 30, 2016, which is hereby incorporated by reference for all purposes as if fully set forth herein.

BACKGROUND

Field

The invention relates generally to a touch sensor, a display device including the same, and a method of driving the touch sensor, and, more particularly, to a touch sensor, a display device including the same, and a method of driving the touch sensor so as to detect both touch location and touch pressure with a capacitive sensor.

Discussion of the Background

As interest in information displays and demand for portable information media increase, research and commercialization has centered on display devices.

Recent display devices include touch sensors for receiving touch inputs of users in addition to image display functions. Accordingly, the users can more conveniently use the display devices through the touch sensors.

Various types of touch sensors are used. A capacitive touch sensor senses a point at which capacitance is changed as a user's hand or object is in contact therewith, thereby detecting a touch position. Since the capacitive touch sensor senses multiple touches and is more accurate than other options, the capacitive touch sensor has recently been widely used.

Recently, various functions have been provided to users' based upon pressures generated due to touches, as well as touch positions. Typically, capacitive touch sensors and separate force sensors have been required to provide functions based upon both touch pressure and position.

The above information disclosed in this Background section is only for enhancement of understanding of the background of the inventive concepts, and, therefore, it may contain information that does not constitute prior art.

SUMMARY

Touch sensors constructed according to the principles of invention are capable of detecting both the position and the pressure of a touch in a single, integrated device.

Display devices constructed according to the principles of invention may include an integrated touch sensor that detects both the position and the pressure of a touch, thereby reducing the manufacturing cost and thickness of the display device.

Additional aspects will be set forth in the detailed description which follows, and, in part, will be apparent from the disclosure, or may be learned by practice of the inventive concepts.

According to one aspect of the invention, a touch sensor includes a substrate, first connection lines to transmit first output signals, first electrodes disposed on the substrate connected to the first connection lines to transmit the first output signals to the first connection lines, second connection lines to transmit second output signals, second electrodes disposed on the substrate connected to the second connection lines to transmit the second output signals to the second connection lines, an auxiliary electrode spaced apart from the substrate, the auxiliary electrode forming a capacitance with the first electrodes and the second electrodes, and a touch controller connected to the first and second connection lines to received the first and second output signals from the first and second connection lines, and to calculate a position and a pressure of a touch, using the first and second output signals.

The touch controller may supply a driving signal to the first electrodes during a first period, and calculate a first capacitance variation, based upon output signals transmitted through the second connection lines during the first period.

The touch controller may calculate a second capacitance variation, based upon output signals transmitted through the first connection lines and output signals output through the second connection lines during a second period.

The second capacitance variation may include a capacitance caused by the touch and a capacitance variation caused by the pressure of the touch.

The first and second electrodes and the auxiliary electrode may be configured such that a capacitance therebetween is changed corresponding to the pressure of the touch.

The touch sensor may further include an insulating member disposed between the between the substrate and the auxiliary electrode.

The insulating member may have elasticity.

The distance between first and second electrodes and the auxiliary electrode may decrease as the pressure of the touch increases.

According to another aspect of the invention, a display device includes a substrate, first electrodes disposed on the substrate and connected to first connection lines, second electrodes disposed on the substrate and connected to second connection lines, a touch controller to calculate a position and a pressure of a touch based upon output signals transmitted through the first connection lines and output signals transmitted through the second connection lines, and a display panel spaced apart from the substrate, the display panel including pixels and an auxiliary electrode to form a capacitance with the first electrodes and the second electrodes.

The display device may further include a touch controller to calculate a position and a pressure of a touch based upon output signals transmitted through the first connection lines and output signals output through the second connection lines.

The touch controller may calculate a second capacitance variation, based upon output signals transmitted through the first connection lines and output signals transmitted through the second connection lines during a second period.

The second capacitance variation includes a capacitance caused by the touch and a capacitance variation caused by the pressure of the touch.

Each of the pixels may include an organic light emitting diode. The auxiliary electrode may be a cathode electrode included in the organic light emitting diodes of the pixels.

The display device may further include an insulating member disposed between the substrate and the display panel.

The insulating member may have elasticity.

A distance between the first and second electrodes and the auxiliary electrode may decrease as the pressure of the touch increases.

According to another aspect of the invention, a method for driving a touch sensor having first and second electrodes includes acquiring first output signals from the second electrodes during a first period, calculating mutual capacitance variations between the first electrodes and second electrodes, which correspond to a touch input to at least one of first electrodes and at least one of the second electrodes, from the first output signals, acquiring second output signals from the first electrodes and the second electrodes during a second period, and calculating a pressure of the touch, using the calculated mutual capacitance variations and a second capacitance variation, wherein the second capacitance variation includes a self-capacitance variation of the first electrodes or the second electrodes, which corresponds to the touch, and a capacitance variation caused by the pressure of the touch.

The capacitance variation caused by the pressure of the touch may correspond to a change in distance between the first and second electrodes and an auxiliary electrode.

The first period and the second period may be alternately repeated.

The method may further include calculating an area of the touch, using the mutual capacitance variation, and calculating the self-capacitance variation from the calculated area of the touch.

The capacitance variation caused by the pressure of the touch may be calculated by subtracting the self-capacitance variation from the second capacitance variation.

As the calculated area of the touch increases, the self-capacitance caused by the touch may increase.

The method may further include calculating the capacitance variation caused by the pressure of the touch, using the second capacitance variation and the calculated capacitance caused by the touch.

The method may further include supplying a driving signal to the first electrodes during the first period, and calculating the self-capacitance variation, using the second output signals during the first period.

The method may further include calculating the second capacitance variation using the first and second output signals during the second period.

The second capacitance variation may include a capacitance caused by the touch and a capacitance variation caused by the pressure of the touch.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
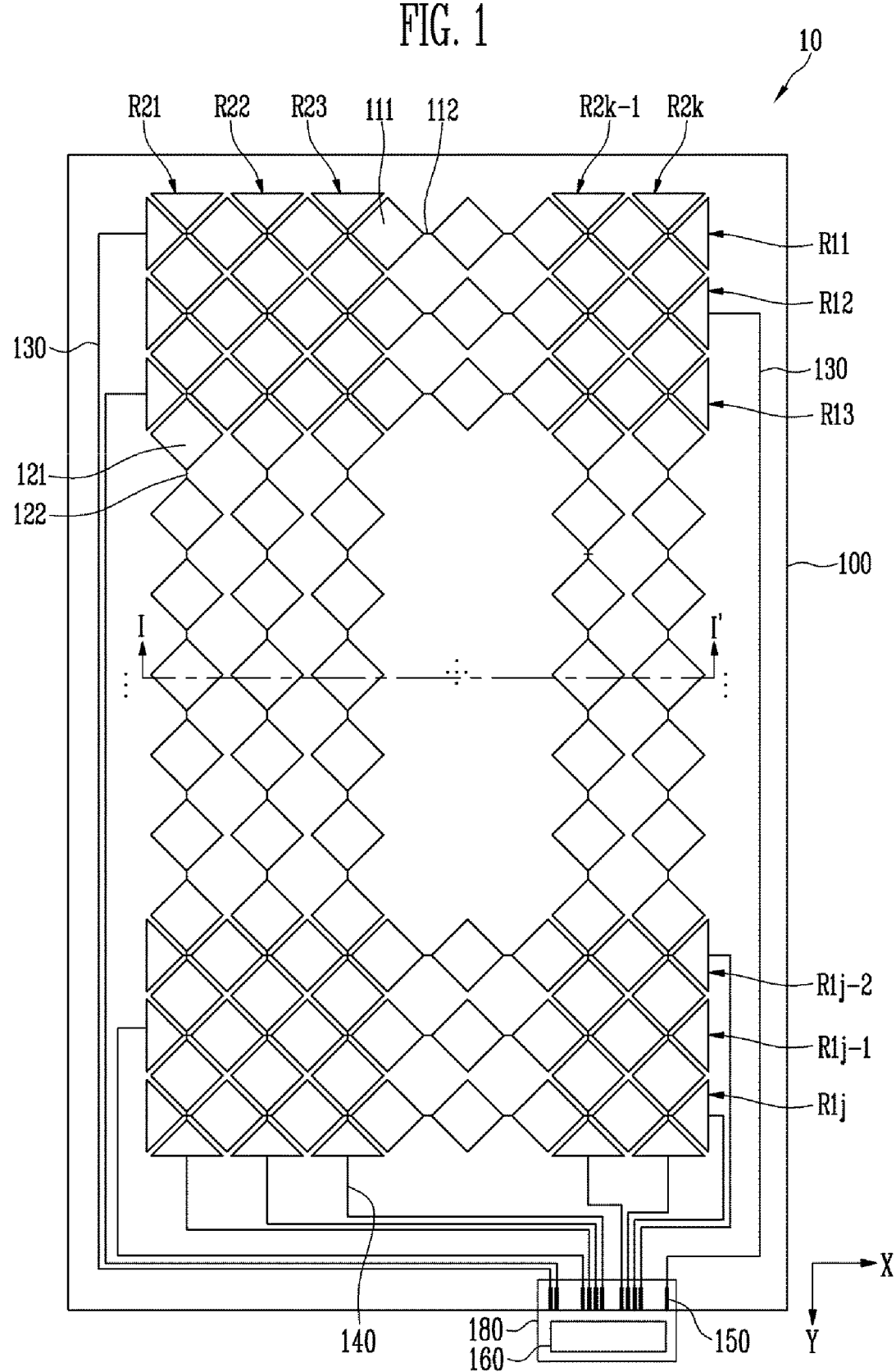
FIG. 1 is a schematic plan view of a display device including a first embodiment of a touch sensor constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch sensor and a display device including the same will be described with reference to exemplary embodiments described in conjunction with the accompanying drawings Referring to FIG. 1, the touch sensor 10 may include a plurality of first electrodes R11 to R1j and a plurality of second electrodes R21 to R2k.

The first electrodes R11 to R1j are formed along a first direction (e.g., an X-axis direction), and may be arranged in plural numbers along a second direction (e.g., a Y-axis direction) intersecting the first direction. FIG. 1 depicts j first electrodes R11 to R1j.

The first electrodes R11 to R1j may include first sensing cells 111 and first connection patterns 112.

The first sensing cells 111 may be arranged at a predetermined distance along the first direction (e.g., along the X-axis direction) and the second direction (e.g., along the Y-axis direction), and a plurality of first connection patterns 112 may allow first sensing cells 111 arranged on the same generally horizontal line to be electrically connected to each other therethrough.

The second electrodes R21 to R2k are formed along the second direction (e.g., along the Y-axis direction), and may be arranged in plural numbers along the first direction (e.g., along the X-axis direction).

In FIG. 1 depicts k second electrodes R21 to R2k.

The plurality of second electrodes R21 to R2k may include second sensing cells 121 and second connection patterns 122.

The second sensing cells 121 may be arranged at a predetermined distance along the first direction (e.g., along the X-axis direction) and the second direction (e.g., along the Y-axis direction), and a plurality of second connection patterns 122 may allow second sensing cells 121 arranged on the same generally vertical column to be electrically connected to each other therethrough.

Thus, the second sensing cells 121 may be distributed and arranged between the first sensing cells without overlapping the first sensing cells 111.

In FIG. 1 shows the first sensing cells 111 and the second sensing cells 121 with a polygonal shape, but the shape of the first sensing cells 111 and the second sensing cells 121 may vary.

In addition, the first sensing cells 111 and the second sensing cells 121 may be located on the same layer.

In that case, in order to prevent contact between the first connection patterns 112 and the second connection patterns 122, an insulating layer may be located at intersection portions of the first connection patterns 112 and the second connection patterns 122.

Or, the first sensing cells 111 and the second sensing cells 121 may be located on different layers.

The first sensing cells 111, the second sensing cells 121, the first connection patterns 112, and the second connection patterns 122 may include a conductive material. For example, the first sensing cells 111, the second sensing cells 121, the first connection patterns 112, and the second connection patterns 122 may include metals or an alloy thereof. The metals may include gold (Au), silver (Ag), aluminum (Al), molybdenum (Mo), chromium (Cr), titanium (Ti), nickel (Ni), neodymium (Nd), copper (Cu), platinum (Pt), and the like.

In addition, the first sensing cells 111 and the second sensing cells 121 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. Each of the first sensing cells 111 and the second sensing cells 121 may be formed in a single layer or in multiple layers.

The first sensing cells 111, the second sensing cells 121, the first connection patterns 112, and the second connection patterns 122 may be made of the same material, or may be made of different materials.

The first sensing cells 111 and the second sensing cells 121 may be located on a substrate 100.

The substrate 100 may be made of an insulating material such as glass or resin. Also, the substrate 100 may be made of a material having flexibility to be bendable or foldable. The substrate 100 may have a single-layered structure or a multi-layered structure.

For example, the substrate 100 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the substrate 100 may be formed from another material, and the substrate 100 may be made of fiber glass reinforced plastic (FRP), or the like.

The touch sensor 10 may be driven in a first sensing mode. Herein, the first sensing mode may mean a driving method (hereinafter, also referred to as a mutual capacitance method) of calculating a position of a touch using a mutual capacitance variation between the first sensing cells 111 and the second sensing cells 121.

When the touch sensor 10 is driven in the first sensing mode, the first electrodes R11 to R1j may serve as driving electrodes, and the second electrodes R21 to R2k may serve as sensing electrodes.

When the touch sensor 10 is driven in the first sensing mode, mutual capacitances exist between the first electrodes R11 to R1j and the second electrodes R21 to R2k, which are adjacent to each other. If a touch is input to the touch sensor 10, mutual capacitances between electrodes R11 to R1j and R21 to R2k corresponding to the touch position are changed.

The touch sensor 10 may also be driven in a second sensing mode. Herein, the second sensing mode may mean a driving method (hereinafter, also referred to as a self-capacitance method) of calculating a pressure of a touch using a self-capacitance variation of the first electrodes R11 to R1j and the second electrodes R21 to R2k.

When the touch sensor 10 is driven in the second sensing mode, the first electrodes R11 to R1j may also serve sensing electrodes.

That is, the first electrodes R11 to R1j may serve as driving electrodes in the first sensing mode, and serve as sensing electrodes in the second sensing mode.

The second electrodes R21 to R2k may serve as sensing electrodes in both of the first sensing mode and the second sensing mode.

When the touch sensor 10 is driven in the second driving mode, if a touch is input to the touch sensor, self-capacitances between first electrodes R11 to R1j and second electrodes R21 to R2k corresponding to the touch are changed.

A plurality of pads 150 may be located at one side of the substrate 100.

First connection lines 130 and second connection lines 140 may be connected to the plurality of pads 150.

The first connection lines 130 may be connected to the respective first electrodes R11 to R1j, and the second connection lines 140 may be connected to the respective second electrodes R21 to R2k.

A touch controller 160 may be connected to the pads 150 through a separate component such as a flexible printed circuit board (FPCB) 180.

Accordingly, the touch controller 160 can be electrically connected to the first electrodes R11 to R1j and the second electrodes R21 to R2k through the connection lines 130 and 140.

Figure 3:
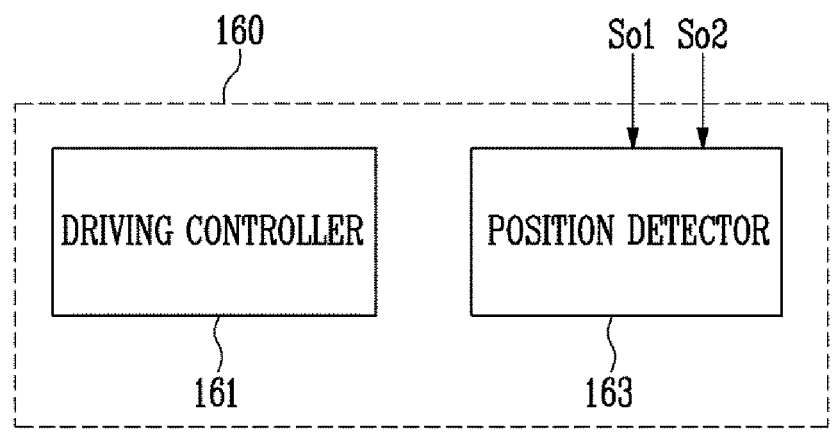
FIG. 3 is a schematic diagram of a touch controller of the display device of FIG. 1.

When the touch sensor 10 is driven in the first sensing mode, the touch controller 160 may supply driving signals to the first electrodes R11 to R1j serving as driving electrodes through the first connection lines 130, and receive first output signals So1 shown in FIG. 3 from the second electrodes R21 to R2k through the second connection lines 140.

The touch controller 160 may calculate a position of a touch using a mutual capacitance variation between the first electrodes R11 to R1j and the second electrodes R21 to R2k, which is reflected in the first output signals So1.

In FIG. 1 depicts the first connection lines 130 connected to the first electrodes R11 to R1j alternately at left and right sides of the first electrodes R11 to R1j. However, the first connection lines 130 may be located at one side of the first electrodes R11 to R1j to be connected to one ends of the respective first electrodes R11 to R1j.

Alternatively, the first connection lines 130 may be located at both sides of the first electrodes R11 to R1j to be simultaneously connected to opposing ends of the first electrodes R11 to R1j.

The second connection lines 140 may be located at a lower side of the second electrodes R21 to R2k to be connected to one ends of the respective second electrodes R21 to R2k.

When the touch sensor 10 is driven in the second sensing mode, the touch controller 160 may receive second output signals So2 shown in FIG. 3 from the first electrodes R11 to R1j serving as sensing electrodes through the first connection lines 130, and receive first output signals So1 from the second electrodes R21 to R2k through the second connection lines 140.

The touch controller 160 may calculate a position of a touch using a self-capacitance variation of electrodes R11 to R1j and R21 to R2k corresponding to the touch, which is reflected in the first output signals So1 and the second output signals So2.

The touch controller 160 may be installed in various ways including chip on glass, chip on plastic, tape carrier package, chip on film, and the like.

Figure 2:
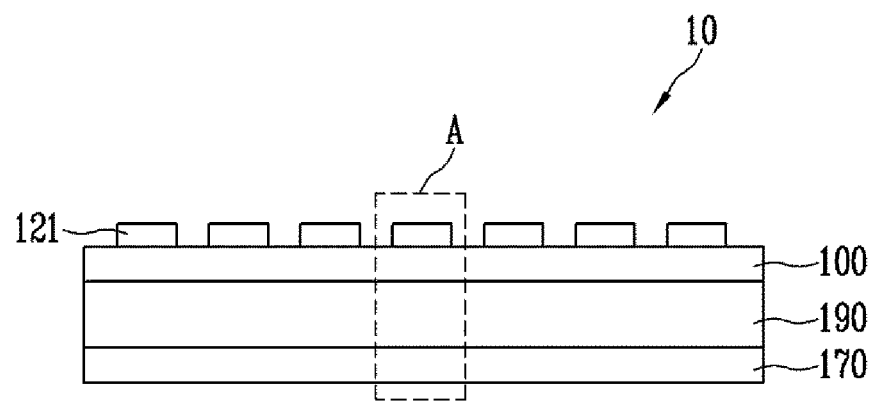
FIG. 2 is a cross sectional view taken along line I-I' of FIG. 1.

Referring to FIG. 2, the touch sensor 10 may further include an insulating member 190 and an auxiliary electrode 170.

The second sensing cells 121 located on the substrate 100 and the auxiliary electrode 170 are spaced apart from each other, and may serve as capacitors. That is, capacitances may be formed between the second sensing cells 121 and the auxiliary electrode 170.

The capacitances between the second sensing cells 121 and the auxiliary electrode 170 may be changed depending on the distance between the second sensing cells 121 and the auxiliary electrode 170.

For example, if a touch occurs on the touch sensor 10, the distance between second sensing cells 121 and the auxiliary electrode 170, which are located in the place corresponding to the touch, is changed, and accordingly, capacitances between the second sensing cells 121 and the auxiliary electrode 170 may be changed.

Although only the sensing cells 121 on the substrate 100 are illustrated in FIG. 2, capacitances may also be formed between the first sensing cells 111 and the auxiliary electrode 170. That is, if a touch occurs on the touch sensor 10 the distance between the first sensing cells 111 and the auxiliary electrode 170, which are located in a place corresponding to the touch, is changed, and accordingly, capacitances between the first sensing cells 111 and the auxiliary electrode 170 may be changed.

The insulating member 190 may be located between the substrate 100 and the auxiliary electrode 170.

The insulating member 190 may perform a function of reducing an external impact. To this end, the insulating member 190 may have elasticity. For example, the insulating member 190 is deformed by a pressure from the outside, and may have elasticity that enables the insulating member 190 to return to the original state when the pressure from the outside is eliminated.

In addition, the insulating member 190 may have an insulating property so as to prevent an electrical short circuit between the sensing cells 111 and 121 and the auxiliary electrode 170.

The insulating member 190 may be provided as a porous polymer to have elasticity. For example, the insulating member 190 may be provided in the form of a foaming body such as sponge.

The insulating member 190 may include thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicon, and the like, and combinations thereof. However, the insulating member 190 may also be formed of some other material.

Referring to FIG. 3, the touch controller 160 may include a driving controller 161 and a position detector 163.

The driving controller 161 may control the touch sensor 10 to be driven in the first sensing mode during a first period, and control the touch sensor 10 to be driven in the second sensing mode during a second period.

The first period and the second period may be alternately repeated.

The driving controller 161 may supply a driving signal to the first electrodes R11 to R1j during the first period, and supply a driving signal to the first electrode R11 to R1j and the second electrodes R21 to R2k during the second period.

The position detector 163 may receive first output signals So1 transmitted through the second connection lines 140 when the touch sensor 10 is driven in the first sensing mode.

Also, the position detector 163 may receive second output signals So2 and first output signals So1, which are transmitted through the first and second connection lines 130 and 140, when the touch sensor 10 is driven in the second sensing mode.

The position detector 163 may calculate a position and a pressure of a touch input to the touch sensor 10, using a mutual capacitance variation as indicated by or in the first output signals So1 and a self-capacitance variation as indicated by or in the second output signals So2.

Hereinafter, a method of calculating a pressure of a touch input to the touch sensor 10 will be described in detail with reference to FIGS. 4 to 7.

Figure 4:
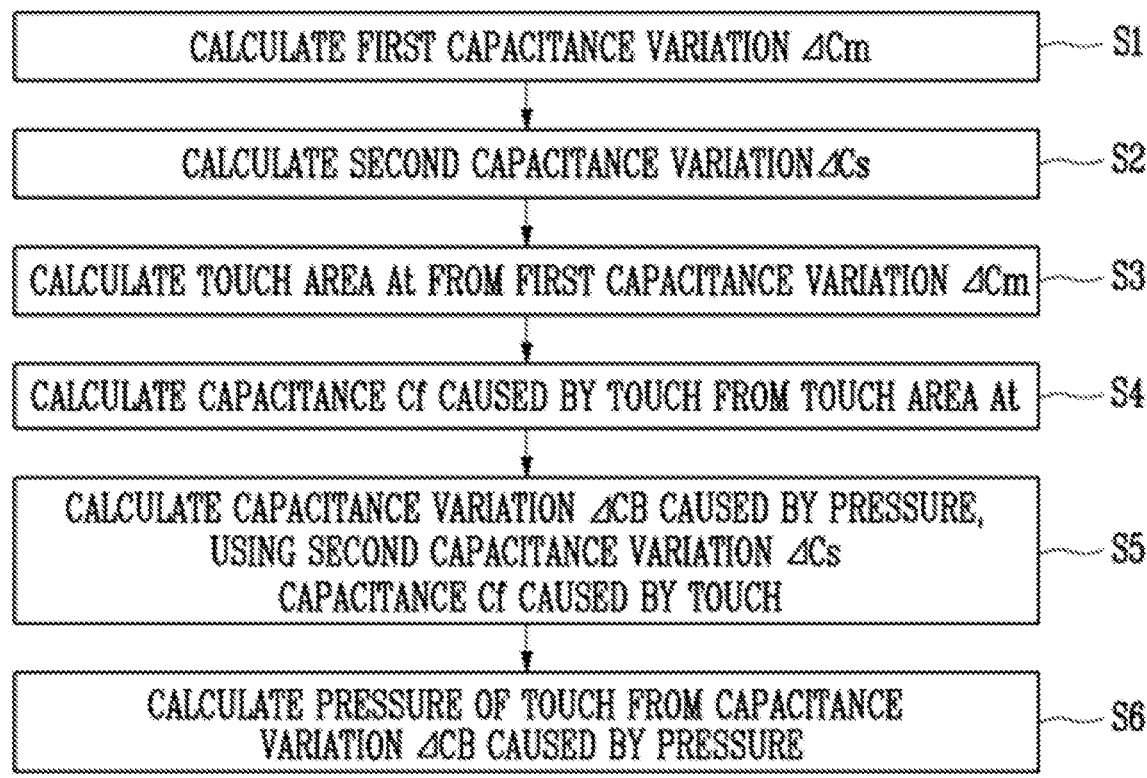
FIG. 4 is a flowchart of an exemplary method of operating the position detector of FIG. 3.

Referring to FIG. 4, first, a first capacitance variation $\Delta Cm$ caused by a touch may be calculated (step S1). Here, the first capacitance variation $\Delta Cm$ may be calculated from first output signals So1 output through the second connection lines 140 when the touch sensor 10 is driven in the first sensing mode.

Therefore, the first capacitance variation $\Delta Cm$ may include a mutual capacitance variation between first electrodes R11 to R1j and second electrodes R21 to R2k, which correspond to the touch.

Next, a second capacitance variation $\Delta Cs$ caused by the touch may be calculated (step S2). Here, the second capacitance variation $\Delta Cs$ may be calculated from second output signals So2 output through the first connection lines 130 and first output signals So1 output through the second connection line 140 when the touch sensor 10 is driven in the second sensing mode.

Figure 5:
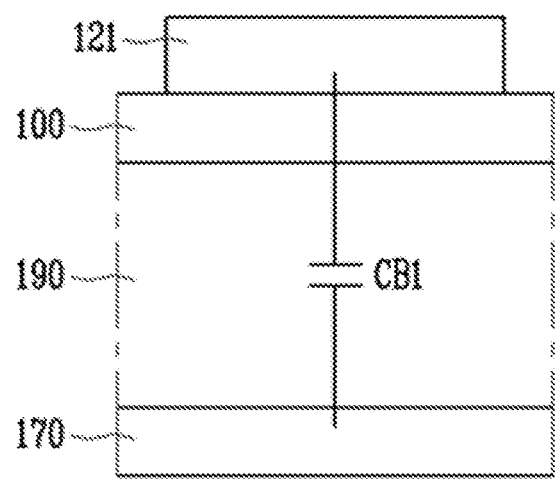
FIGS. 5 to 7 are schematic side views of the touch sensor of FIG. 3 illustrating operation when the touch sensor is driven in a second sensing mode.
Figure 6:
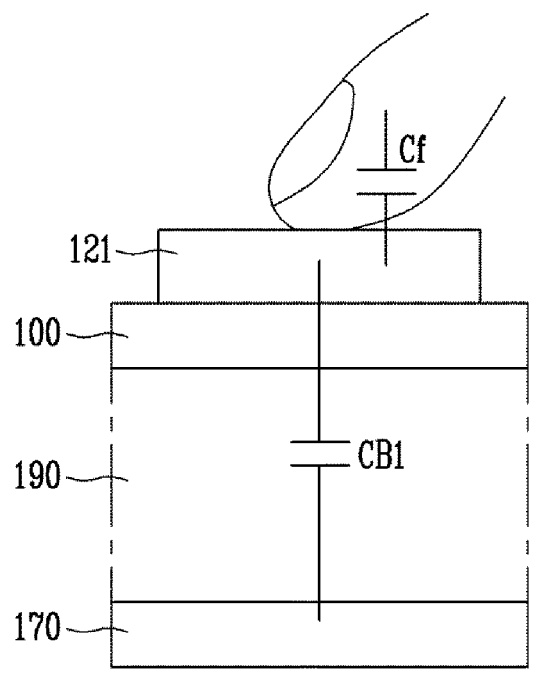
Figure 7:
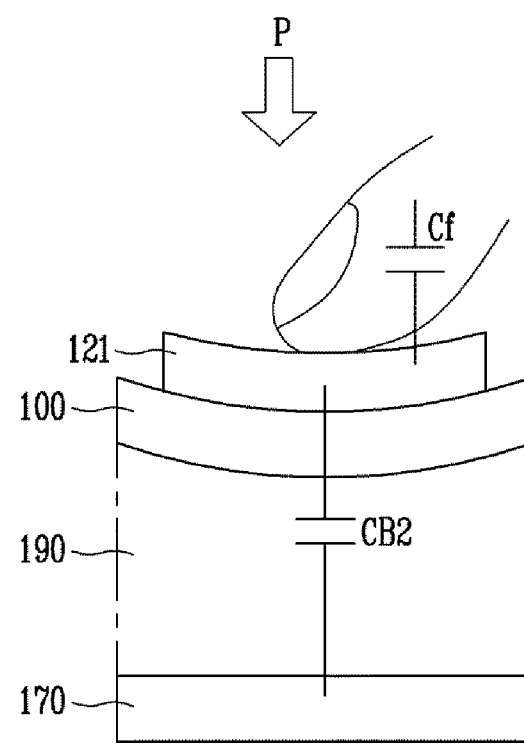

FIGS. 5 to 7 show an operation of the touch sensor when the touch sensor is driven in the second sensing mode. Particularly, a state in which no touch is input to the touch sensor has been illustrated in FIG. 5, a state in which a touch is input in area A but no pressure P is applied in the area A has been illustrated in FIG. 6, and a state in which a pressure P is applied in the area A has been illustrated in FIG. 7.

Referring to FIG. 5, when no touch is input to the touch sensor 10, a first capacitance CB1 may be formed between the second sensing cell 121 and the auxiliary electrode 170.

That is, when no touch is input to the touch sensor 10, a self-capacitance of the second sensing cell 121 may correspond to the first capacitance CB1.

Referring to FIG. 6, when a first touch is input to the touch sensor 10, the self-capacitance of the second sensing cell 121 may include the first capacitance CB1 between the second sensing cell 121 and the auxiliary electrode 170 and a capacitance Cf caused by the touch.

Here, the first touch is a touch from which a pressure P is eliminated, and may mean a state in which the touch sensor 10 and a finger are in simple contact with each other (e.g., such that the shape of the touch sensor is not changed) or a state in which the finger is hovering.

When the first touch is input, the self-capacitance variation of the second sensing cell 121, i.e., the second capacitance variation $\Delta Cs$ may become the capacitance Cf caused by the touch.

Next, referring to FIG. 7, when a second touch is input to the touch sensor 10, the self-capacitance of the second sensing cell 121 may include a second capacitance CB2 between the second sensing cell 121 and the auxiliary electrode 170 and a capacitance Cf caused by the touch.

Here, the second touch may mean a touch that applies a pressure P.

When the pressure P is applied to the touch sensor 10, a distance between the second sensing cell 121 and the auxiliary electrode 170 may be narrowed, and accordingly, a capacitance between the second sensing cell 121 and the auxiliary electrode 170 may be changed.

For example, the capacitance between the second sensing cell 121 and the auxiliary electrode 170 may be changed from the first capacitance CB1 to the second capacitance CB2. That is, a difference between the second capacitance CB2 and the first capacitance CB1 may be a capacitance variation $\Delta CB$ caused by the pressure P.

The position detector 163 may detect a magnitude and other variables of the pressure P, using the capacitance variation $\Delta CB$ caused by the pressure P.

However, a signal indicating the capacitance Cf caused by the touch and a signal indicating the capacitance variation $\Delta CB$ caused by the pressure P are not separately output, but a signal is output indicating both of the capacitance Cf caused by the touch and the capacitance variation $\Delta CB$ caused by the pressure P.

Therefore, the capacitance variation $\Delta CB$ caused by the pressure P may be extracted from the second capacitance variation $\Delta Cs$ so as to calculate the pressure P of the touch.

After the capacitance Cf caused by the touch is calculated, the capacitance variation $\Delta CB$ caused by the pressure P may be obtained. Specifically, since the second capacitance variation $\Delta Cs$ satisfies the following Equation 1, the capacitance Cf caused by the touch may be calculated first, and the capacitance variation $\Delta CB$ caused by the pressure P may then be calculated using a difference between the second capacitance variation $\Delta Cs$ and the capacitance Cf caused by the touch.

$$\Delta Cs = \Delta CB + Cf \qquad \text{Equation 1}$$

When the above-described first touch is input, the capacitance variation $\Delta CB$ caused by the pressure P may be 0.

In order to calculate the capacitance variation $\Delta CB$ caused by the pressure P, the position detector 163 may calculate a touch area At from the first capacitance variation $\Delta Cm$ (step S3).

The first capacitance variation $\Delta Cm$ includes a mutual capacitance variation between first electrodes R11 to R1j and second electrodes R21 to R2k, which correspond to the touch, and the magnitude of the mutual capacitance variation may be influenced by the size of the touch area At.

For example, as the touch area At becomes wider, the mutual capacitance variation becomes larger. As the touch area At becomes narrower, the mutual capacitance variation becomes smaller.

The position detector 163 may calculate the touch area At using the first capacitance variation ΔCm reflected to the first output signals So1 and a look-up table (LUT).

The LUT may include numerical values of the first capacitance variation ΔCm and numerical values of the touch area At, which are mapped to the respective numerical values of the first capacitance variation ΔCm.

The touch sensor 10 may include a memory for storing the LUT.

Unlike where the touch area At is calculated using the LUT, the touch area At may be calculated with reference to the following Equation 2.

$$\Delta Cm = a \times At2 + b \times At + c \qquad \text{Equation 2}$$

Coefficients a, b, and c included in Equation 2 may be variously changed.

Referring to FIG. 4, the position detector 163 may calculate a capacitance Cf caused by the touch from the calculated touch area At (step S4).

In this case, the capacitance Cf caused by the touch may be calculated using the calculated touch area At and an LUT. The LUT may include numerical values of the touch area At and numerical values of the capacitance Cf caused by the touch, which are mapped to the respective numerical values of the touch area At.

Unlike where the capacitance Cf caused by the touch is calculated using the LUT, the capacitance Cf caused by the touch may be calculated with reference to the following Equation 3.

$$Cf = a' \times At2 + b' \times At + c' \qquad \text{Equation 3}$$

Coefficients a', b', and c' included in Equation 3 may be variously changed.

Next, the position detector 163 may calculate a capacitance variation ΔCB caused by the pressure P, using the second capacitance variation ΔCs and the calculated capacitance Cf caused by the touch (step S5). In this case, the capacitance variation ΔCB caused by the pressure P may be calculated using the above-described Equation 1.

Finally, the position detector 163 may calculate a magnitude and other variables of the pressure P from the capacitance variation ΔCB caused by the pressure P (step S6).

FIG. 4 shows the second capacitance variation ΔCs calculated after the first capacitance variation ΔCm is calculated. However, the order of calculating the first capacitance variation ΔCm and the second capacitance variation ΔCs may be altered.

Since the pressure of a touch is acquired from a capacitance variation caused by the touch, the touch sensor 10 might not further include separate components for acquiring a capacitance variation between the sensing cells 111 and 121 and the auxiliary electrode 170 (e.g., connection lines for transmitting an output signal indicating only the capacitance variation ΔCB caused by the pressure P).

As will be described in more detail below, when the touch sensor 10 is included in a display device, a partial configuration of a display panel is used as the auxiliary electrode 170 of the touch sensor 10. Therefore, a separate auxiliary electrode 170 for sensing a pressure might not be provided.

This, in turn, makes it possible to reduce the size, thickness, fabrication cost, and the like of the touch sensor 10.

Figure 8:
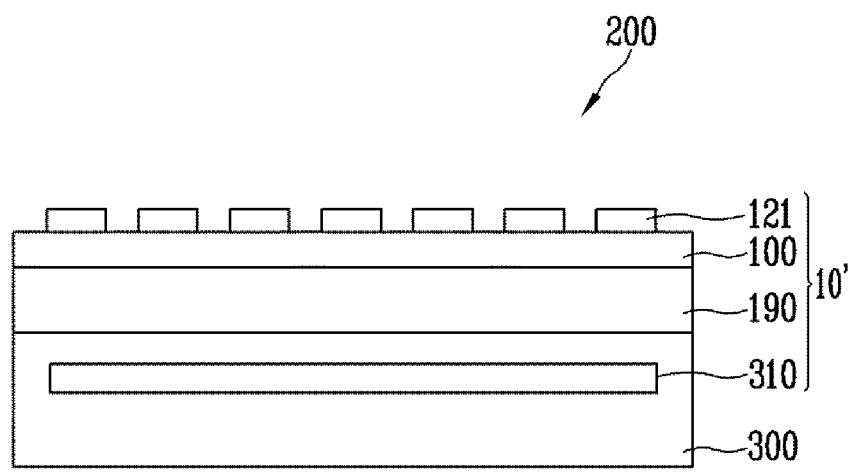
FIG. 8 is a schematic cross sectional view of a display device illustrating a second embodiment of a touch sensor constructed according to the principles of the invention.

Referring to FIG. 8, the display device 200 may include a touch sensor 10' and a display panel 300.

The display panel 300 is a device for providing images to a user, and may display images through a plurality of pixels. The display panel 300 may include a cathode electrode 310 for allowing organic light emitting diodes included in the pixels to emit light.

The touch sensor 10' may include a substrate 100, sensing cells 111 and 121, and an insulating member 190.

The touch sensor 10' shown in FIG. 8 is identical to the above-described touch sensor 10 except that the touch sensor 10' may use the cathode electrode 310 included in the display panel 300 as the above-described auxiliary electrode 170.

According to the design of the display panel 300, the insulating member 190 may be located between the substrate 100 and the display panel 300.

The touch sensor 10' may perform the same function as the above-described touch sensor 10, and therefore, its detailed description will be omitted to avoid redundancy.

The display device 200 may further include a window located on the touch sensor 10'.

Figure 9:
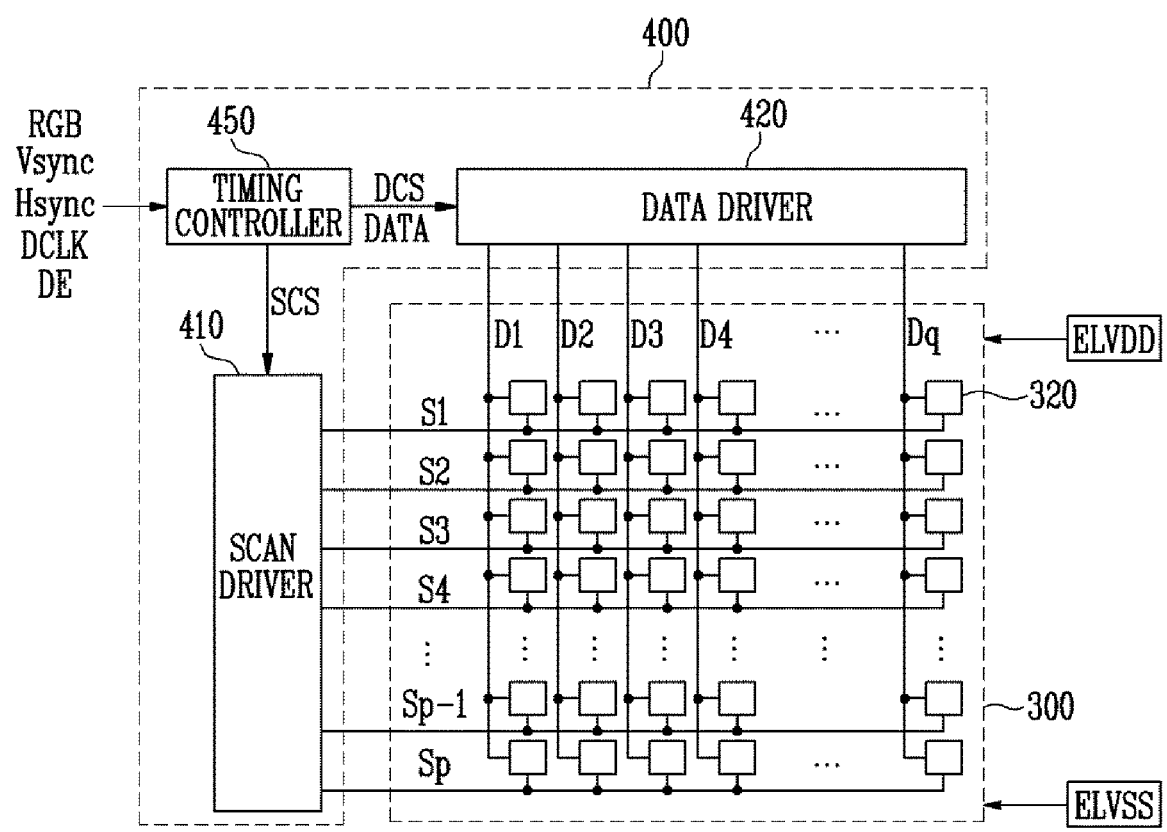
FIG. 9 is a schematic plan view of a display panel including touch sensors constructed according to the principles of the invention.

In FIG. 9, pixels 320 of a display panel 300 are illustrated for convenience of description, and other components (e.g., a substrate and an encapsulation layer) of the display panel 300 are omitted to avoid redundancy.

Referring to FIG. 9, the pixels 320 are located on a substrate, and may be connected to data lines D1 to Dq and scan lines S1 to Sp. For example, the pixels 320 may be arranged in a matrix form at intersection portions of the data lines D1 to Dq and the scan lines S1 to Sp.

The pixels 320 may be supplied with data and scan signals through the data lines D1 to Dq and the scan lines S1 to Sp.

Also, the pixels 320 may be connected to a first power source ELVDD and a second power source ELVSS.

Each of the pixels 320 may include a light emitting device such as, for example, an organic light emitting diode. Each of the pixels 320 may generate light corresponding to the data signal by current flowing from the first power source ELVDD to the second power source ELVSS via the light emitting device.

The display device 200 may further include a display driver 400 for driving the display panel 300.

The display driver 400 may include a scan driver 410, a data driver 420, and a timing controller 450.

The scan driver 410 may supply scan signals to the scan lines S1 to Sp in response to a scan driver control signal SCS. For example, the scan driver 410 may sequentially supply the scan signals to the scan lines S1 to Sp.

In order to connect the scan driver 410 to the scan lines S1 to Sp, the scan driver 410 may be directly mounted on the substrate 330 on which the pixels 320 are formed, or may be connected to the substrate 330 through a separate component such as an FPCB.

The data driver 420 may receive a data driver control signal DCS and image data DATA, input from the timing controller 450, to generate a data signal.

The data driver 420 may supply the data signal to the data lines D1 to Dq.

In order to connect the data driver 420 to the data lines D1 to Dq, the data driver 420 may be directly mounted on the substrate 330 on which the pixels 320 are formed, or may be connected to the substrate 330 through a separate component such as an FPCB.

If a scan signal is supplied to a specific scan line, some pixels 320 connected to the specific scan line may be supplied with a data signal transmitted from the data lines D1 to Dq. The some pixels 320 may emit light with a luminance corresponding to the supplied data signal.

The timing controller 450 may generate control signals for controlling the scan driver 410 and the data driver 420.

For example, the control signals may include the scan driver control signal SCS for controlling the scan driver 410 and the data driver control signal DCS for controlling the data driver 420.

The timing controller 450 may generate the scan driver control signal SCS and the data driver control signal DCS, using an external input signal.

For example, the external input signal may include a dot clock DCLK, a data enable signal DE, a vertical synchronization signal Vsync, and a horizontal synchronization signal Hsync.

In addition, the timing controller 450 may supply the scan driver control signal SCS to the scan driver 410 and may supply the data driver control signal DCS to the data driver 420.

The timing controller 450 may convert image data RGB input from the outside into image data DATA suitable for specifications of the data driver 420, and may supply the converted image data DATA to the data driver 420.

The data enable signal DE is a signal that defines a period in which effective data is input, and one period may be set to one horizontal period such as by the horizontal synchronization signal Hsync.

FIG. 9 shows the scan driver 410, the data driver 420, and the timing controller 450 individually, but at least some of the components may be combined.

In addition, the scan driver 410, the data driver 420, and the timing controller 450 may be installed in various ways including chip on glass, chip on plastic, tape carrier package, chip on film, and the like.

Figure 10:
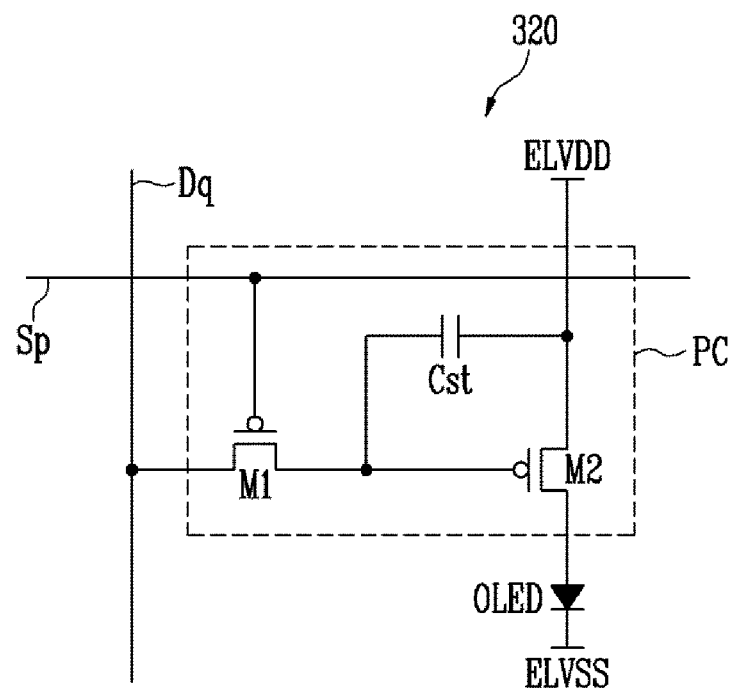
FIGS. 10 and 11 are schematic circuit diagrams of a pixel of the display panel of FIG. 9.
Figure 11:
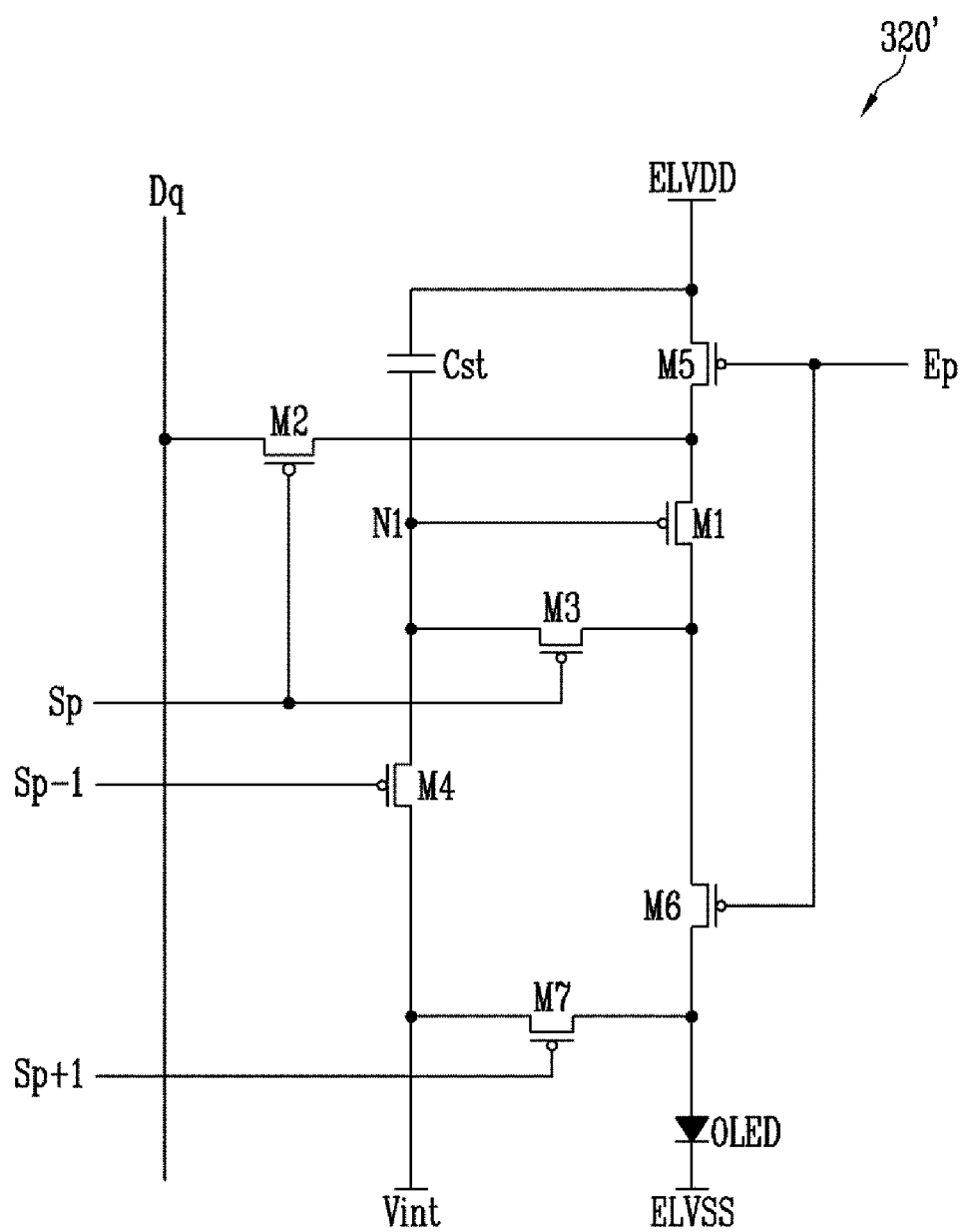

Referring to FIGS. 10 and 11, pixels 320 and 320' each connected to a pth scan line Sp and a qth data line Dq are shown for convenience of description.

First, referring to FIG. 10, a pixel 320 includes an organic light emitting diode OLED and a pixel circuit PC connected to the qth data line Dq and the pth scan line Sp to control the organic light emitting diode OLED.

An anode electrode of the organic light emitting diode OLED may be connected to the pixel circuit PC, and a cathode electrode of the organic light emitting diode OLED may be connected to the second power source ELVSS.

The organic light emitting diode OLED may generate light with a predetermined luminance, corresponding to current supplied to the pixel circuit PC.

The pixel circuit PC may store a data signal supplied through the qth data line Dq when a scan signal is supplied through the pth scan line Sp. The pixel circuit PC may control the amount of current supplied to the organic light emitting diode OLED, corresponding to the stored data signal.

For example, the pixel circuit PC may include a first transistor M1, a second transistor M2, and a storage capacitor Cst.

The first transistor M1 may be connected between the qth data line Dq and the second transistor M2.

For example, a gate electrode of the first transistor M1 may be connected to the pth scan line Sp, a first electrode of the first transistor M1 may be connected to the qth data line Dq, and a second electrode of the first transistor M1 may be connected to a gate electrode of the second transistor M2.

The first transistor M1 may be turned on when the scan signal is supplied from the pth scan line Sp to supply the data signal from the qth data line Dq to the storage capacitor Cst.

In this case, the storage capacitor Cst may charge to a voltage corresponding to the data signal.

The second transistor M2 may be connected between the first power source ELVDD and the organic light emitting diode OLED.

For example, the gate electrode of the second transistor M2 may be connected to a first electrode of the storage capacitor Cst and the second electrode of the first transistor M1, a first electrode of the second transistor M2 may be connected to a second electrode of the storage capacitor Cst and the first power source ELVDD, and a second electrode of the second transistor M2 may be connected to the anode electrode of the organic light emitting diode OLED.

The second transistor M2 is a driving transistor, and may control the amount of current flowing from the first power source ELVDD to the second power source ELVSS via the organic light emitting diode OLED, corresponding to the voltage stored in the storage capacitor Cst.

The organic light emitting diode OLED may generate light corresponding to the amount of current supplied from the second transistor M2.

The first electrode of each of the transistors M1 and M2 may be set as any one of a source electrode and a drain electrode, and the second electrode of each of the transistors M1 and M2 may be set as an electrode of a type different from the first electrode. For example, if the first electrode is set as a source electrode, the second electrode may be set as a drain electrode.

FIG. 10 shows the transistors M1 and M2 as PMOS transistors. However, the transistors M1 and M2 may be implemented as NMOS transistors or other types of transistors.

Referring to FIG. 11, a pixel 320' may include an organic light emitting diode OLED, first to seventh transistors M1 to M7, and a storage capacitor Cst.

An anode electrode of the organic light emitting diode OLED may be connected to the first transistor M1 via the sixth transistor M6, and a cathode electrode of the organic light emitting diode OLED may be connected to the second power source ELVSS. The organic light is emitting diode OLED may generate light with a predetermined luminance, corresponding to current supplied from the first transistor M1.

The first power source ELVDD may be set to a higher voltage than the second power source ELVSS such that the current flows through the organic light emitting diode OLED.

The seventh transistor M7 may be connected between an initialization power source Vint and the anode electrode of the organic light emitting diode OLED. In addition, a gate electrode of the seventh transistor M7 may be connected to a (p+1)th scan line Sp+1. The seventh transistor M7 may be turned on when a scan signal is supplied through the (p+1)th scan line Sp+1, to supply a voltage of the initialization power source Vint to the anode electrode of the organic light emitting diode OLED. The initialization power source Vint may be set to a lower voltage than a data signal.

The sixth transistor M6 may be connected between the first transistor M1 and the organic light emitting diode OLED. In addition, a gate electrode of the sixth transistor M6 may be connected to a pth light emitting control line Ep. The sixth transistor M6 may be turned off when a light emitting control signal is supplied through the pth light emitting control line Ep, and otherwise turned on.

The fifth transistor M5 may be connected between the first power source ELVDD and the first transistor M1. In addition, a gate electrode of the fifth transistor M5 may be connected to the pth light emitting control line Ep. The fifth transistor M5 may be turned off when the light emitting control signal is supplied through the pth light emitting control line Ep, and otherwise turned on.

A first electrode of the first transistor (driving transistor) M1 may be connected to the first power source ELVDD via the fifth transistor M5, and a second electrode of the first transistor M1 may be connected to the anode electrode of the organic light emitting diode OLED via the sixth transistor M6. In addition, a gate electrode of the first transistor M1 may be connected to a first node N1. The first transistor M1 may control the amount of current flowing from the first power source ELVDD to the second power source ELVSS via the organic light emitting diode OLED, corresponding to a voltage of the first node N1.

The third transistor M3 may be connected between the second electrode of the first transistor M1 and the first node N1. In addition, a gate electrode of the third transistor M3 may be connected to the pth scan line Sp. The third transistor M3 may be turned on when a scan signal is supplied through the pth scan line Sp, to allow the second electrode of the first transistor M1 and the first node N1 to be electrically connected to each other. Therefore, the first transistor M1 may be diode-connected when the third transistor M3 is turned on.

The fourth transistor M4 may be connected between the first node N1 and the initialization power source Vint. In addition, a gate electrode of the fourth transistor M4 may be connected to a (p−1)th scan line Sp−1. The fourth transistor M4 may be turned on when a scan signal is supplied through the (p−1)th scan line Sp−1, to supply the voltage of the initialization power source Vint to the first node N1.

The second transistor M2 may be connected between the qth data line Dq and the first electrode of the first transistor M1. In addition, a gate electrode of the second transistor M2 may be connected to the pth scan line Sp. The second transistor M2 may be turned on when the scan signal is supplied through the pth scan line Sp, to allow the qth data line Dq and the first electrode of the first transistor M1 to be electrically connected to each other.

The storage capacitor Cst may be connected between the first power source ELVDD and the first node N1. The storage capacitor Cst may store the data signal a voltage is corresponding to a threshold voltage of the first transistor M1.

The first electrode of each of the transistors M1, M2, M3, M4, M5, M6, and M7 may be set as any one of a source electrode and a drain electrode, and the second electrode of each of the transistors M1, M2, M3, M4, M5, M6, and M7 may be set as an electrode of a type different from the first electrode. For example, if the first electrode is set as a source electrode, the second electrode may be set as a drain electrode.

FIG. 11 shows transistors M1, M2, M3, M4, M5, M6, and M7 as PMOS transistors. However, the transistors M1, M2, M3, M4, M5, M6, and M7 may be implemented as NMOS transistors or as other types of transistors.

The structure of each of the pixels described in FIGS. 10 and 11 is merely an example, and therefore, the pixels 320 and 320' are not limited to the above-described structures. In practice, each of the pixels 320 and 320' has a circuit structure capable of supplying current to the organic light emitting diode OLED, and may be selected as any one of various structures known in the art for doing so.

The first power source ELVDD may be a high-potential power source, and the second power source ELVSS may be a low-potential power source.

For example, the first power source ELVDD may be set to a positive voltage, and the second power source ELVSS may be set to a negative voltage or to the ground voltage.

Figure 12:
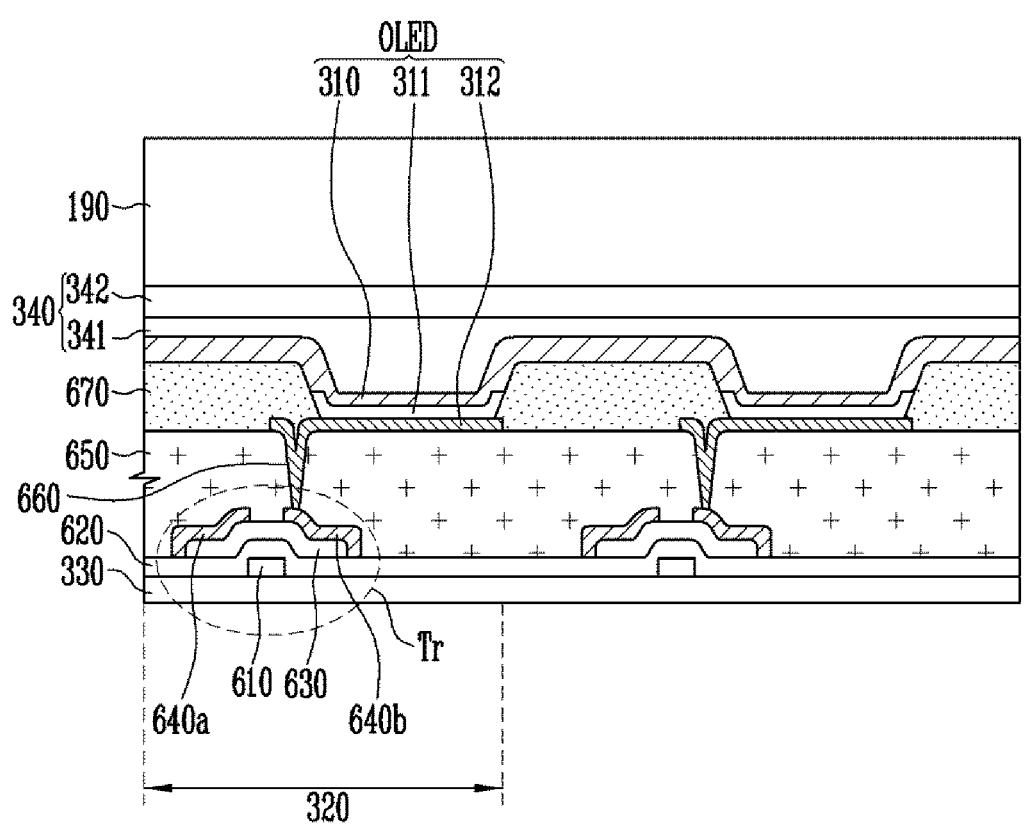
FIG. 12 is a partial, cross sectional view of a display panel including a touch sensor constructed according to the principles of the invention.

Referring to FIG. 12, an organic light emitting diode OLED may include an anode electrode 312, an emitting layer 311, and a cathode electrode 310.

The emitting layer 311 may be located between the anode electrode 312 and the cathode electrode 310.

The emitting layer 311 may include an organic emission layer for self-is luminescence.

The emitting layer 311 may be formed in a structure in which a hole transporting layer, the organic emission layer, and an electron transporting layer are stacked. Additionally, the emitting layer 311 may further include a hole injection layer and an electron injection layer.

Holes injected from the anode electrode 312 and electrons injected from the cathode electrode 310 may be combined in the organic emission layer to form excitons, and light having a specific wavelength is generated from each emitting layer 311 by energy from the formed excitons.

Particularly, the cathode electrode 310 may be connected to the second power source ELVSS.

The cathode electrode 310 may include a conductive material. For example, the conductive material may include metals, any alloy thereof, a conductive polymer, a transparent conductive material, and the like.

For example, the cathode electrode 310 may include a material selected from the materials listed above for the first and second electrodes R1 and R2.

Also, the cathode electrode 310 may serve as the above-described auxiliary electrode 170 of the touch sensor 10.

A plurality of pixels 320 may be located on a substrate 330. The pixel 320 may include a pixel circuit including a driving transistor Tr, and the organic light emitting diode OLED.

In FIG. 12, only the driving transistor Tr directly related to the organic light emitting diode OLED has been illustrated for convenience of description. However, to control light emission of the organic light emitting diode OLED, the pixel circuit may additionally is include another transistor, a capacitor, and the like, in addition to the driving transistor Tr.

The driving transistor Tr is formed on the substrate 330, and may be disposed corresponding to each organic light emitting diode OLED.

The driving transistor Tr may include a gate electrode 610, a gate insulating layer 620, a semiconductor layer 630, and source/drain electrodes 640a and 640b.

The gate electrode 610 may be formed on the substrate 330.

The gate insulating layer 620 may be formed over the gate electrode 610. For example, the gate insulating layer 620 may be formed of an insulating material such as silicon oxide ($SiO_x$) or silicon nitride ($SiN_x$).

The semiconductor layer 630 may be formed on the gate insulating layer 620. For example, the semiconductor layer 630 may be formed of poly-silicon obtained by crystallizing amorphous silicon using a laser, or of some other material and/or in some other manner.

Also, the semiconductor layer 630 may be formed of amorphous silicon, oxide semiconductor, or the like, in addition to the poly-silicon.

The source/drain electrodes 640*a* and 640*b* may be located at both sides of the semiconductor layer 630, respectively.

A protective layer 650 may be located over the driving transistor Tr. The protective layer 650 may include a contact hole 660 that exposes the source electrode 640*a* or the drain electrode 640*b* therethrough. In FIG. 12, a case where the drain electrode 640*b* is exposed through the contact hole 660 has been illustrated as an example.

The gate electrode 610 and the source/drain electrodes 640*a* and 640*b* may be formed of a metal including molybdenum (Mo), tungsten (W), titanium (Ti), aluminum (Al), and the like, or of any alloy or stack structure thereof, or in some other manner.

The anode electrode 312 may be formed on the protective layer 650. The anode electrode 312 may be connected to the source electrode 640*a* or the drain electrode 640*b* through the contact hole 660. FIG. 12 shows the anode electrode 312 connected to the drain electrode 640*b* through the contact hole 660.

The protective layer 650 may be formed of an insulating material such as silicon oxide or silicon nitride.

A pixel defining layer 670 may be located on the protective layer 650. Also, the pixel defining layer 670 may expose at least a partial region of the anode electrode 312 therethrough.

The pixel defining layer 670 may be made of one of an acryl-based organic compound and an organic insulating material such as polyamide or polyimide or of various other insulating materials.

An encapsulation layer 340 may be located over the organic light emitting diode OLED. The encapsulation layer 340 may be located over the cathode electrode 310.

Also, the encapsulation layer 340 may be formed of a structure in which a plurality of layers are stacked. For example, the encapsulation layer 340 may include at least one organic layer 341 and at least one inorganic layer 342.

FIG. 12 shows the encapsulation layer 340 with one organic layer 341 and one inorganic layer 342. However, the encapsulation layer may include a plurality of organic layers 341 and/or a plurality of inorganic layers. The organic layers 341 and the inorganic layers 342 may be alternately stacked.

According to the principles of the invention, it is possible to provide an integrated touch sensor structure that detects the position and pressure of a touch.

Also, it is possible to provide a display device including an integrated touch sensor that detects the position and pressure of a touch, thereby reducing the manufacturing cost and thickness of the display device by eliminating the need for additional structure to detect the pressure of the touch.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
a substrate;
first electrodes comprising first sensing cells and disposed on the substrate and connected to first connection lines;
second electrodes comprising second sensing cells and disposed on the substrate and connected to second connection lines;
a touch controller to calculate a position and a pressure of a touch based upon output signals transmitted through the first connection lines and output signals transmitted through the second connection lines; and
a display panel disposed spaced apart from the substrate, the display panel including pixels and an auxiliary electrode to form a capacitance with the first electrodes and the second electrodes,
wherein the touch controller is configured to selectively operate the first and second electrodes in a mutual capacitance mode or in a self-capacitance mode by:
during a first period corresponding to the mutual capacitance mode, supplying driving signals to the first electrodes through the first connection lines and receiving mutual capacitance output signals from the second electrodes through the second connection lines, and
during a second period corresponding to the self-capacitance mode, receiving self-capacitance output signals from the first electrodes through the first connection lines and receiving self-capacitance output signals from the second electrodes through the second connection, lines,
wherein each of the pixels includes an organic light emitting diode, and
wherein the auxiliary electrode is a cathode electrode included in the organic light emitting diode of each of the pixels.

2. The display device of claim 1, wherein the touch controller is further configured to:
calculate a first capacitance variation, based upon the mutual capacitance output signals transmitted through the second connection lines during the first period.

3. The display device of claim 1, wherein the touch controller is further configured to calculate a second capacitance variation, based upon the self-capacitance output signals transmitted through the first and second connection lines during the second period.

4. The display device of claim 3, wherein the second capacitance variation includes a capacitance caused by the touch and a capacitance variation caused by the pressure of the touch.

5. The display device of claim 1, further including an insulating member disposed between the substrate and the display panel.

6. The display device of claim 5, wherein the insulating member has elasticity.

7. The display device of claim 1, wherein a distance between the first and second electrodes and the auxiliary electrode decreases as the pressure of the touch increases.

8. A method for driving a display device having pixels, an auxiliary electrode, and first and second electrodes selectively in either a mutual capacitance mode or a self-capacitance mode, the method comprising the steps of:
during a first period corresponding to the mutual capacitance mode, supplying driving signals to the first electrodes and acquiring mutual capacitance output signals from the second electrodes;
in the first period, calculating from the mutual capacitance output signals mutual capacitance variations between the first electrodes and the second electrodes, which correspond to a touch input to at least one of the first electrodes and at least one of the second electrodes;
during a second period corresponding to the self capacitance mode, acquiring first self-capacitance output signals from the first electrodes and acquiring second self-capacitance output signals from the second electrodes; and
calculating a pressure of the touch, using the calculated mutual capacitance variations and a second capacitance variation, wherein the second capacitance variation includes a self-capacitance variation of the first electrodes from the first self-capacitance output signals or a self-capacitance variation of the second electrodes from the second self-capacitance output signals, which corresponds to the touch, and a capacitance variation caused by the pressure of the touch, wherein each of the pixels includes an organic light emitting diode, and wherein the auxiliary electrode is a cathode electrode included in the organic light emitting diode of each of the pixels.

9. The method of claim 8, wherein the capacitance variation caused by the pressure of the touch corresponds to a change in distance between the first and second electrodes and an auxiliary electrode.

10. The method of claim 8, wherein the first period and the second period are alternately repeated.

11. The method of claim 8, further comprising:
calculating an area of the touch, using the mutual capacitance variations; and
calculating the self-capacitance variation from the calculated area of the touch.

12. The method at claim 11, wherein the capacitance variation caused by the pressure of the touch is calculated by subtracting the self-capacitance variation from the second capacitance variation.

13. The method of claim 11, wherein, as the mutual capacitance variations increase, the calculated area of the touch increases.

14. The method of claim 11, wherein, as the calculated area of the touch increases, the self-capacitance variation caused by the touch increases.

15. The method of claim 11, further comprising calculating the capacitance variation caused by the pressure of the touch, using the second capacitance variation and the calculated self-capacitance variation caused by the touch.

* * * * *